Figure 1:
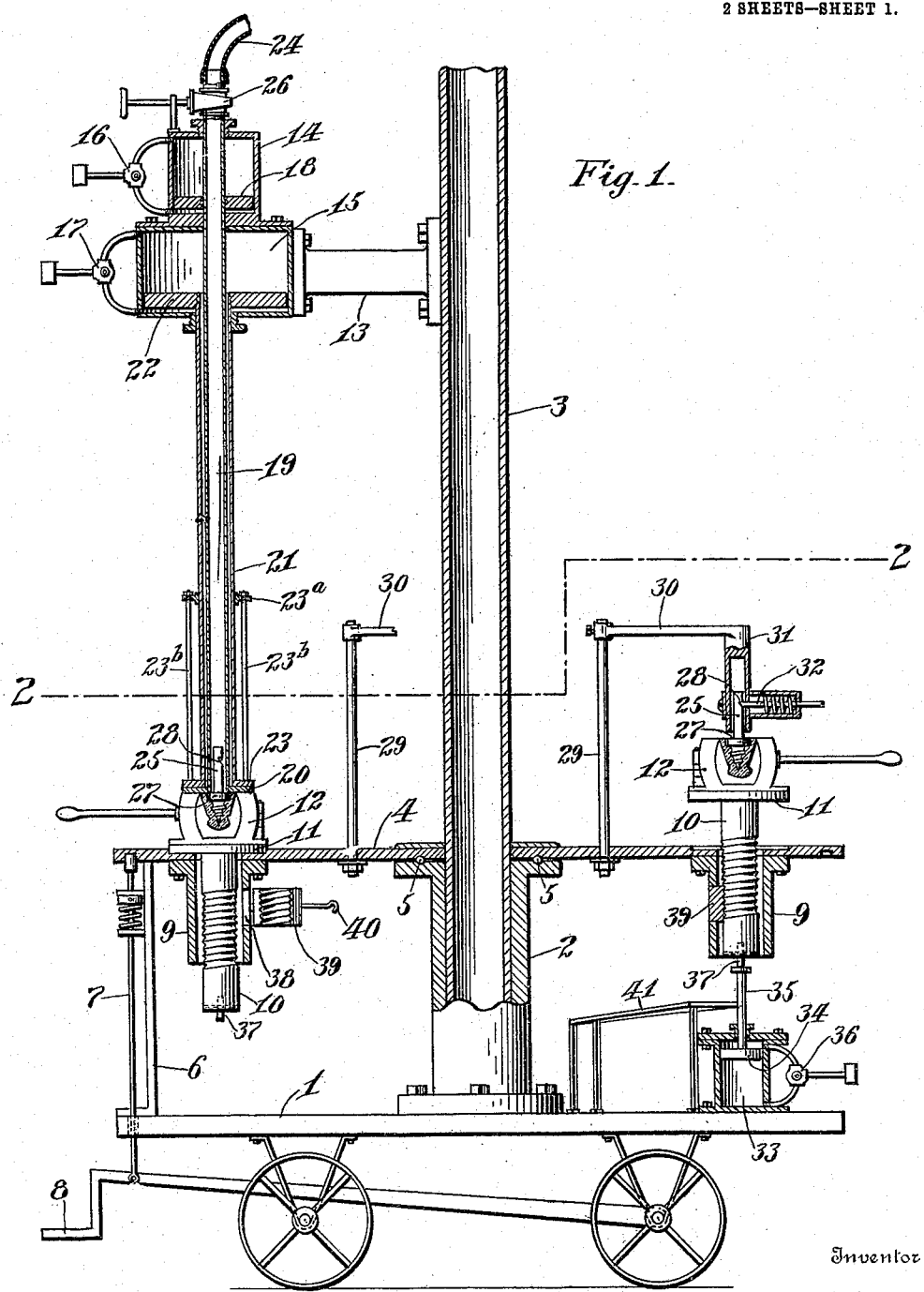

C. M. ZURN.
MACHINE FOR PRODUCING GLASS INSULATORS.
APPLICATION FILED FEB. 4, 1909.

937,137.

Patented Oct. 19, 1909.
2 SHEETS—SHEET 1.

Witnesses

Inventor
Charles M. Zurn,
By Joshua R. H. Potts
Attorney

C. M. ZURN.
MACHINE FOR PRODUCING GLASS INSULATORS.
APPLICATION FILED FEB. 4, 1909.
937,137.
Patented Oct. 19, 1909.
2 SHEETS—SHEET 2.
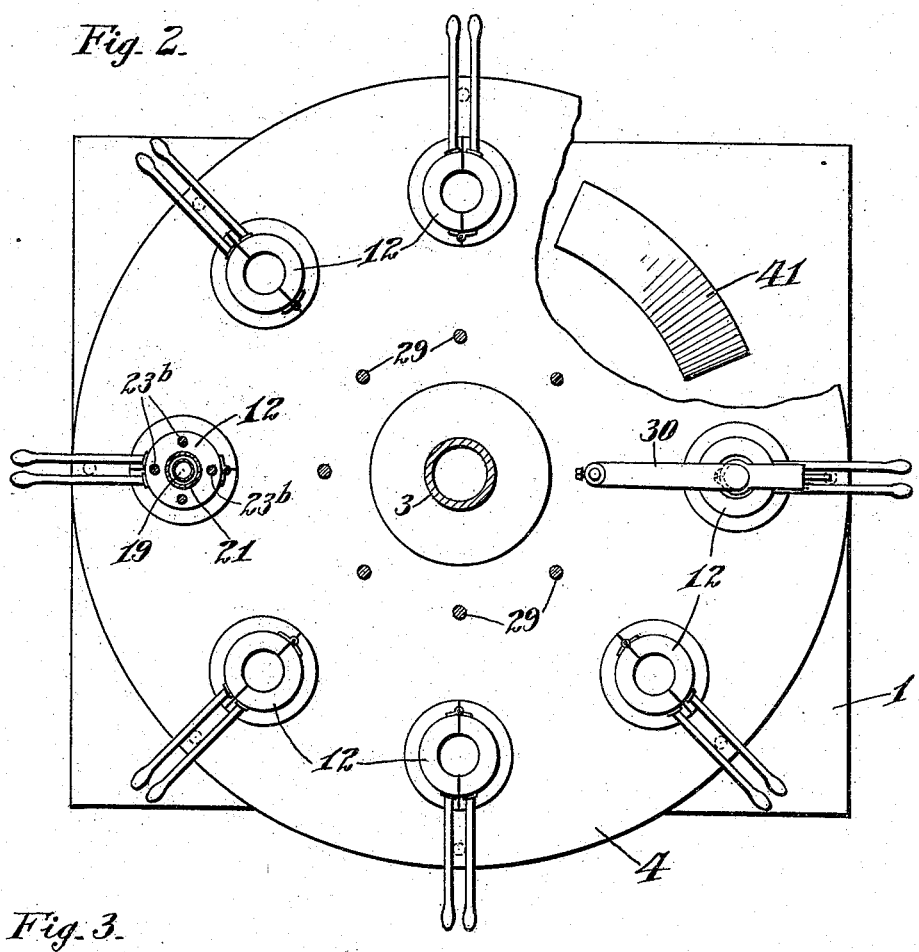
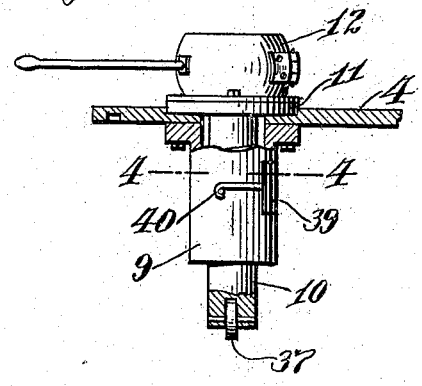
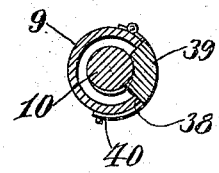
Witnesses
Theo. Rosemann
J. A. L. Mulhall
Inventor
Charles M. Zurn,
By Joshua R. H. Potts
Attorney

UNITED STATES PATENT OFFICE.

CHARLES M. ZURN, OF BRIDGETON, NEW JERSEY.

MACHINE FOR PRODUCING GLASS INSULATORS.

937,137.  Specification of Letters Patent.  Patented Oct. 19, 1909.

Application filed February 4, 1909. Serial No. 476,165.

*To all whom it may concern:*

Be it known that I, CHARLES M. ZURN, a citizen of the United States, residing at Bridgeton, in the county of Cumberland and State of New Jersey, have invented certain new and useful Improvements in Machines for Producing Glass Insulators, of which the following is a specification.

My invention relates to an improved machine for producing glass insulators, the object of the invention being to provide improved means for moving the threaded mold plungers into the molten glass, improved means for closing the upper ends of the molds, and improved means for enabling the withdrawal of the molded insulators from off the plunger while the latter is held stationary.

A further object is to provide improved mounting for a series of molds, improved means for elevating the molds, improved means for grasping and holding the mold plungers, while the molds are elevated, and improved means for enabling the molds to be turned to unscrew the insulator from off the plunger, and improved means for permitting the molds to assume their normal positions.

With these and other objects in view, the invention consists in certain novel features of construction, and combinations, and arrangements of parts as will be more fully hereinafter described and pointed out in the claims.

In the accompanying drawings, Figure 1, is a view partly in vertical section, and partly in elevation illustrating my improvements. Fig. 2, is a horizontal sectional plan view on the line 2—2 of Fig. 1, partly broken away. Fig. 3, is a detail view partly in elevation and partly in section of one of the molds. Fig. 4, is a view in section on the line 4—4 of Fig. 3.

1 represents a wheeled truck or platform, supporting the tubular post 2, in which the vertical column 3 is fixed.

4 represents a rotary table turning about the column 3, and separated upon post 2, by ball bearings 5, to permit an easy turning of the table.

The truck 1, at one end, is provided with a prop, or support 6, over which the table moves, and is adapted to support the same at the point of molding, and a spring latch 7 is adapted to engage the table and center the molds in proper position, as will be readily understood. This latch is operated by a treadle 8, or may be operated by any desired means.

To the under face of table 4, an annular series of depending sleeves 9 are secured, and register with openings in the table. These sleeves 9 are of sufficient internal diameter to allow free vertical movement of screw threaded rods 10 mounted therein, and depend from mold carrying platforms 11, on which 12 are supported.

An arm 13, fixed to column 3, supports a pair of pneumatic cylinders 14 and 15, one above the other, and of different diameters, the upper cylinder constituting a low pressure cylinder, and the lower, a high pressure cylinder, for a purpose which will more fully hereinafter appear. The passage of air to and from these cylinders, is regulated by valves 16 and 17 respectively, operated by any desired means, to control the inlet and exhaust of air therefrom. The upper, or low pressure cylinder 14, has a piston 18 therein, secured upon a tubular piston rod 19, which latter projects through the cylinder 15, and is provided at its lower end with a ring or cap plate 20, adapted to seat itself on the upper end of the mold 12, and press the glass therein. This tubular piston rod 19, is surrounded by a larger tubular piston rod 21, the latter secured to a piston 22, in high pressure cylinder 15, and the tube 21 is provided at its lower end, with a ring or cap plate 23, adapted to bear on the cap plate 20, and exert the maximum of pressure on the latter, enabling pressure to be applied to the mold by two stages or steps, first, by low pressure, and then by high pressure, so as to overcome any liability of forcing out the molten glass. The ring or cap plate 23 is strengthened by rods $23^b$ connecting the ring or cap plate with a cross head or ring $23^a$ secured on tube 21.

The tubular piston rod 19, extends through the upper end of cylinder 14, and is connected by a pipe or hose 24, with any approved suction apparatus, whereby air may be sucked up through the tubular piston rod 19, to hold my improved plunger 25 in the lower end thereof, and a valve 26, operated by any approved means, is provided, to open and close the passage through tubular piston rod 19, so as to permit the plunger 25 to be released from the rod whenever desired.

This plunger 25, comprising a screw threaded portion at its lower end, conforming to the internal screw threaded contour of the insulator to be molded, and it has an annular shoulder 27, to fit tightly against the lower end of the tubular rod 19, and be held therein by suction. The plunger has a notched extension 28, which, during the molding operation, extends upward into the tubular rod 19, as clearly shown at the left in Fig. 1.

To the table 4, a series of standards 29 are secured, one standard being provided for each mold, and swinging horizontal arms 30, are supported on standards 29, and carry depending tubular sockets 31. These sockets 31 are provided with horizontal spring-pressed catches 32, adapted to enter the notched extension 28 of the plunger 25, and hold the plunger in the socket, when the mold is elevated to a position, to project the plunger extension into the socket. These arms 30 are mounted to swing on standards 29, so as to enable them to pass the tubular piston rods 19 and 21 at molding point, at the left of Fig. 1, and are swung directly over the molds, when the latter reach a position directly above a pneumatic cylinder 33, supported on the truck. This cylinder 33 has a piston 34 therein, and a rod 35, which latter when the cylinder is operated by compressed air, controlled by a suitable valve 36, will engage the small roller 37, on the lower end of rod 10, and move the rod and its mold to an elevated position, seen at the right in Fig. 1, so as to project the plunger into the socket 31, and enable the spring catch 32 to engage in the notch in the plunger and hold it against downward movement.

All of the sleeves 9 above referred to, are made with openings 38, and blocks 39 are hinged at one end to the sleeve, and at the other end are provided with catches 40, so that said blocks can be swung into the openings 38. These blocks 39 are thicker than the walls of sleeves 9 and are made with screw threads at their inner faces, so as to mesh with the screw threads of rods 10. Hence when the rods 10 and their molds are elevated to project the plunger 25 into the sockets 31, the block 39 can be swung into the sleeve 9, and will mesh with the threads of the rod 10, when by clasping the mold handles, the mold can be turned to unscrew the mold insulator from the plunger, it being understood of course, that the screw threads of rod 10 and block 39, are of the same pitch as the screw threads of the plunger 25. When the mold is unscrewed from the plunger, the table is turned slightly, so that the roller 37 at the lower end of rod 10 will be above an inclined track 40, supported on truck 1. When in this position, the block 39 can be thrown out of the sleeve 9, and as the table moves around, the roller 37 will roll down the inclined track 41, and allow the mold to gradually descend to its proper position on the table 4.

The operation is as follows: As each mold receives its proper quantity of molten glass and is moved to the position shown in the left of Fig. 1, the plunger 25 is in position in the tubular piston rod 19, and the latter is moved downward by its piston. Piston 18 connected to tubular piston rod 19 is in the low pressure cylinder 14, and hence the plate 20 will be gradually forced onto the top of the mold to slowly press the molten glass and form a perfect closure at the top of the mold. The high pressure cylinder 15 is then brought into operation to move piston 22 and tubular piston rod 21 downward, to bring cap plate 23 into operation, and this high pressure completes the pressure on the glass, and insures a perfect mold. By first applying a slight pressure and then a greater pressure, there is no danger of forcing the glass from the mold by reason of air bubbles and the like in the mold, and all air is gradually forced out before the high pressure cylinder comes into action, and the valve 26 is then operated to release the plunger 25, and when both pistons 18 and 22 are operated to raise the cap plates from the mold, the mold can be moved to the position shown at the right of Fig. 1, and be elevated by piston 34 to enable the spring catch 32 to lock the plunger 25 in the socket 31. The block 39 is then moved into position, and the mold turned to unscrew the glass insulator from plunger 25, the mold is then moved over the track 41, and block 39 swung out of the sleeve 9, when the track will guide the mold down to its normal position on the table, as the latter turns. As many of these molds may be provided as the table will accommodate, and a great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In an apparatus of the character described, the combination with a mold-carrying table, of two pneumatic cylinders, pistons in said cylinders, a tubular piston rod secured to one of said pistons, and carrying a mold cap plate at its lower end, a second tubular piston rod secured to the other piston and surrounding the first mentioned piston rod, and a cap plate or ring at the lower end of said last mentioned piston rod and above the first mentioned cap plate, both of said cap plates adapted to be pressed down upon the mold.

2. In an apparatus of the character described, the combination with a mold-carrying table, of two pneumatic cylinders, pistons in said cylinders, a tubular piston rod secured to one of said pistons, and carrying a mold cap plate at its lower end, a second tubular piston rod secured to the other piston and surrounding the first mentioned piston rod, and a cap plate or ring at the lower end of said last mentioned piston rod and above the first mentioned cap plate, both of said cap plates adapted to be pressed down upon the mold, said first mentioned tubular rod constituting an air suction tube, and a plunger held in said tube by the suction therein.

3. In an apparatus of the character described, the combination with a mold-carrying table, of two pneumatic cylinders, pistons in said cylinders, a tubular piston rod secured to one of said pistons, and carrying a mold cap plate at its lower end, a second tubular piston rod secured to the other piston and surrounding the first mentioned piston rod, and a cap plate or ring at the lower end of said last mentioned piston rod and above the first mentioned cap plate, both of said cap plates adapted to be pressed down upon the mold, said first mentioned tubular rod constituting an air suction tube, and a plunger held in said tube by the suction therein, and valves controlling the passage of air to and from said cylinders and through said inner tube.

4. In an apparatus of the character described, the combination with a mold-carrying table, and molds thereon, of high and low pressure cylinders, pistons in said cylinders, a piston rod secured to the low pressure cylinder, a mold cap plate at the lower end of said rod, a tubular piston rod secured to the piston in the high pressure cylinder and surrounding said first mentioned rod, and a cap plate or ring secured to the lower end of said tubular piston rod and adapted to bear against the first mentioned cap plate.

5. In an apparatus of the character described, the combination with a mold-carrying table, of depending sleeves on said table, molds on said table, screw threaded rods secured to said molds and disposed in said sleeves, plunger holding means movable above said molds, means for moving said molds vertically, and movable blocks adapted to project into said sleeves, and screw threads on said blocks to mesh with the screw threads on the rods, rollers on the lower ends of said screw threaded rods, and an inclined track to receive said rollers, and enable the molds to gradually lower, when permitted by said blocks.

6. In an apparatus of the character described, the combination with a mold-carrying table, and a series of molds thereon, of mold plungers, notched extensions on said plungers, standards on said table, swinging arms on said standards, sockets on said arms adapted to receive the notched extensions on the plunger, spring catches in said sockets to engage the extensions, and lock the plungers therein, and pneumatic means for holding said plungers and forcing them into the glass of the molds.

7. In an apparatus of the character described, the combination with a mold carrying table, of a mold on said table, a cap plate for the mold, a ring above said cap plate, and independent means for operating said cap plate and ring.

8. In an apparatus of the character described, the combination with a mold carrying table, of a mold on said table, a cap plate for the mold, a ring above said cap plate, two pneumatic cylinders, pistons in said cylinders, and devices connecting the respective pistons with said cap plate and ring, whereby said cap plate and ring are independently operated.

9. In an apparatus of the character described, the combination with a mold carrying table, of a mold on said table, a cap plate for the mold, a ring above said cap plate, two pneumatic cylinders, pistons in said cylinders, devices connecting the respective pistons with said cap plate and ring, whereby said cap plate and ring are independently operated, and a mold plunger constructed and adapted to be removably supported in the center of said cap plate.

In testimony whereof I have signed my name to this specification in the presence of two subscribing witnesses.

CHARLES M. ZURN.

Witnesses:
 THOS. W. WILLIAMS,
 WILLIAM B. TRENCHARD.